(12) United States Patent
Bruce

(10) Patent No.: US 8,317,219 B2
(45) Date of Patent: Nov. 27, 2012

(54) WHEELED CART FOR TRANSPORTING OUTDOOR EQUIPMENT

(76) Inventor: Robert S Bruce, Sioux Falls, SD (US)

( * ) Notice: Subject to any disclaimer, the term of this patent is extended or adjusted under 35 U.S.C. 154(b) by 0 days.

(21) Appl. No.: 13/423,742

(22) Filed: Mar. 19, 2012

(65) Prior Publication Data

US 2012/0235387 A1 Sep. 20, 2012

Related U.S. Application Data

(60) Provisional application No. 61/454,002, filed on Mar. 18, 2011.

(51) Int. Cl.
B62B 1/00 (2006.01)
(52) U.S. Cl. ...... 280/651; 280/654; 280/641; 280/47.26
(58) Field of Classification Search ............... 280/47.26, 280/33.997, 47.131, 652, 655, 654, 641, 280/47.17, DIG. 3, 651; 190/18 A, 108, 190/112
See application file for complete search history.

(56) References Cited

U.S. PATENT DOCUMENTS

| 1,554,034 | A | * | 9/1925 | Richie | 280/654 |
|---|---|---|---|---|---|
| 1,718,962 | A | * | 7/1929 | Kimball | 280/655 |
| 2,472,203 | A | * | 6/1949 | Friedmann et al. | 280/652 |
| 2,868,557 | A | * | 1/1959 | Klipp et al. | 280/47.131 |
| 3,276,786 | A | * | 10/1966 | Olander | 280/33.997 |
| 3,701,541 | A | * | 10/1972 | Tarducci et al. | 280/37 |
| 3,754,771 | A | * | 8/1973 | Shagoury | 280/654 |
| 4,452,468 | A | * | 6/1984 | Eads et al. | 280/641 |
| 4,887,837 | A | * | 12/1989 | Bonewicz et al. | 280/654 |
| 4,915,408 | A | * | 4/1990 | Clemence et al. | 280/655 |
| 5,022,574 | A | * | 6/1991 | Cesari | 190/18 A |
| 5,209,517 | A | * | 5/1993 | Shagoury | 280/654 |
| 5,244,219 | A | * | 9/1993 | Hadlum | 280/47.26 |
| 5,630,602 | A | * | 5/1997 | Vanderslice et al. | 280/47.26 |
| 5,660,476 | A | * | 8/1997 | DeCoster | 190/108 |
| 5,931,583 | A | * | 8/1999 | Collie | 383/89 |
| 6,367,822 | B1 | * | 4/2002 | Hutchins | 280/47.24 |
| 6,805,225 | B2 | * | 10/2004 | Freedman | 190/112 |
| 6,880,851 | B1 | * | 4/2005 | Summers et al. | 280/652 |
| 7,188,714 | B1 | * | 3/2007 | Herold | 190/18 A |
| 7,726,671 | B2 | * | 6/2010 | Musi | 280/47.26 |

* cited by examiner

Primary Examiner — Hau Phan
(74) Attorney, Agent, or Firm — Etherton Law Group, LLC; Sandra L. Etherton; Benjamin D. Tietgen

(57) ABSTRACT

A rolling cart for transporting items commonly used at outdoor gatherings in a secure and convenient manner. The cart comprises a frame having two or more tires 20, an open-ended bag connected to the frame, and a strap that holds one or more items of equipment against the frame. The strap is positioned near the open end of the bag and is used to cinch equipment that extends outside the bag against the frame.

3 Claims, 11 Drawing Sheets ns
WHEELED CART FOR TRANSPORTING OUTDOOR EQUIPMENT

CROSS-REFERENCE TO RELATED APPLICATIONS

This application claims the benefit of co-pending U.S. Provisional Application No. 61/454,002 filed Mar. 18, 2011.

FIELD OF INVENTION

The following description relates generally to carts and more particularly to a wheeled cart for carrying items commonly used at outdoor gatherings in a secure and convenient manner.

BACKGROUND

At outdoor gatherings where people gather to watch a certain event, such as music festivals and sports tournaments, attendees often carry various items of different sizes, shapes, and weights with them to the area where they will be seated for the event. It is common for attendees to bring their own folding chairs, umbrellas, food, beverages, cameras, blankets, and other items that might be desired during the event. Presently no carrier is designed to easily transport the items of disparate dimensions that attendees take with them to comfortably spend a day outdoors.

Handcarts are two-wheeled carts for moving relatively lightweight objects by hand, by pushing or pulling the cart. Handcarts are generally a rigid open box of sorts that is mounted to two small solid tires, and are sometimes collapsible. Handcarts are suited to carrying objects that fit entirely within the box, such as food, beverages, cameras, blankets and the like. However, a handcart doesn't accommodate long tube-like objects such as folding chairs or beach umbrellas. Another disadvantage is that when a two-wheel box cart is towed over a rough surface, the hard tires of the cart do nothing to absorb any shocks, and the shocks of the rough surface are transferred directly to the cart, damaging the contents therein and making the cart unstable. In muddy or wet terrains, the tires 20 of a two-wheel box cart may sink into the ground, making further movement of the cart difficult. Further, even if collapsible, the rigid box makes the cart quite bulky even when it is empty, so that transporting it in a car to and from the outdoor event is problematic.

Handtrucks are also two-wheeled carts, but they are used for moving relatively heavy objects by hand, and generally consist of a tall, rectangular, rigid planar framework with handles at the top and a metal blade at the bottom that is inserted beneath a load, the entire assembly being tilted backward until balanced for easy pushing or pulling. Handtrucks are better suited to carrying long objects than handcarts, but do not carry smaller items well because they fall off the blade unless they are contained in a separate carrier. Handtrucks usually have air-filled tires that are substantially bigger than handcart tires, which makes for a smother ride on hard surfaces, but handtrucks do not fare well on soft ground due to the weight of the cart. Finally, handtrucks are not collapsible. It would be desirable to have a single cart that easily transports items of disparate dimensions smoothly over uneven and soft terrain.

Therefore, it is an object of this invention to provide a cart for carrying items commonly used at outdoor gatherings. In is another object to provide a single cart to transport items of disparate dimensions in a secure and convenient manner, while negotiating rough terrain with ease and being foldable into a compact, lightweight structure.

SUMMARY OF THE INVENTION

The present invention is a rolling cart for transporting items commonly used at outdoor gatherings in a secure and convenient manner. A frame supports an open-ended bag. The frame has tires 20 on one end and a handle on the other. The cart also has a strap positioned near the open end of the bag which is used to cinch equipment that extends outside the bag against the frame. The strap makes it less awkward and cumbersome to carry long items that extend outside the bag, such as folded chairs or umbrellas, in the same carrier with smaller items that sit near the bottom of the bag or in side pockets. The cart is collapsible for easy storage.

DETAILED DESCRIPTION OF THE INVENTION

Figure 1:
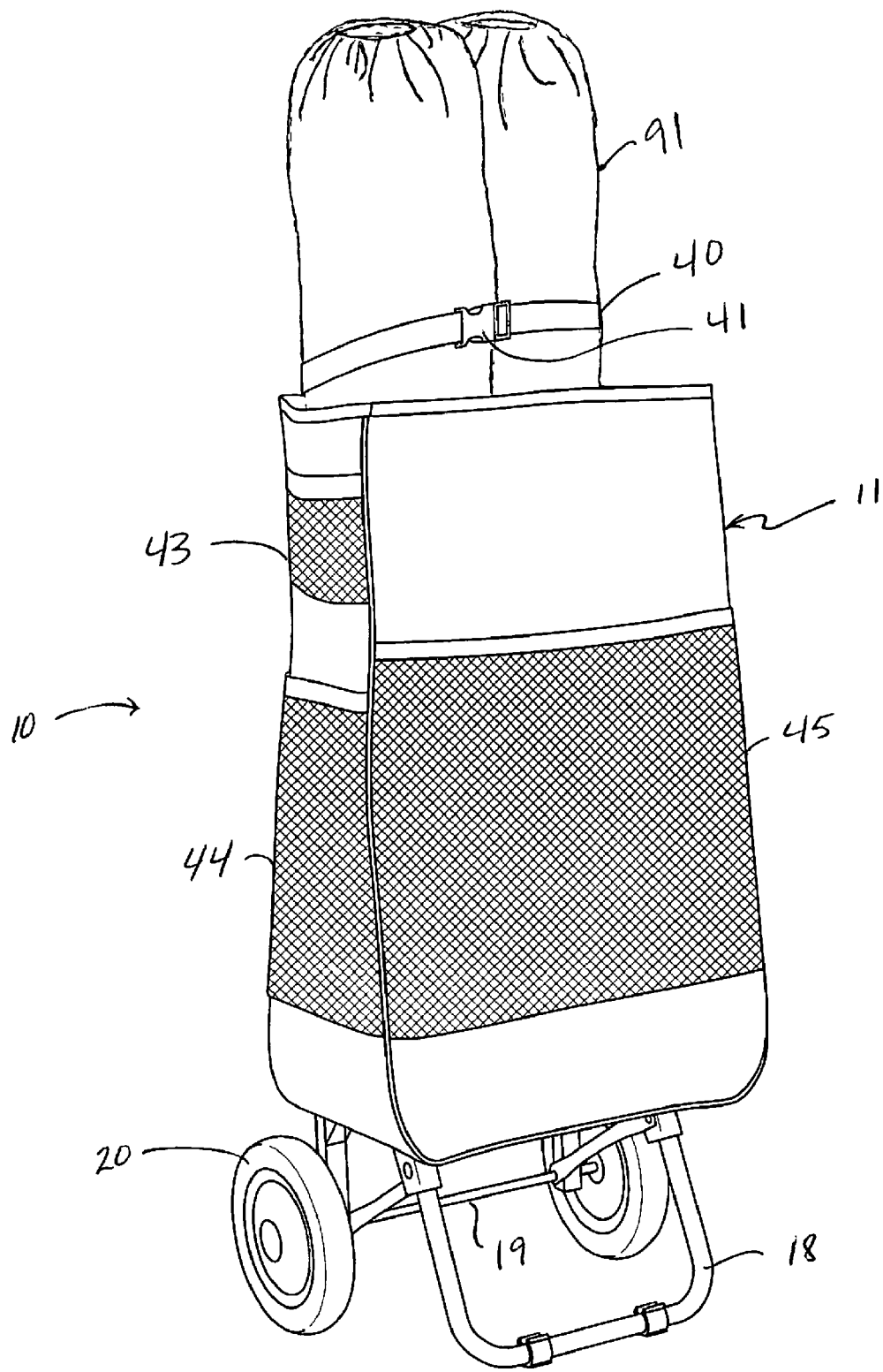
FIG. 1 is a front left perspective view of a preferred embodiment of the wheeled cart.
Figure 2:
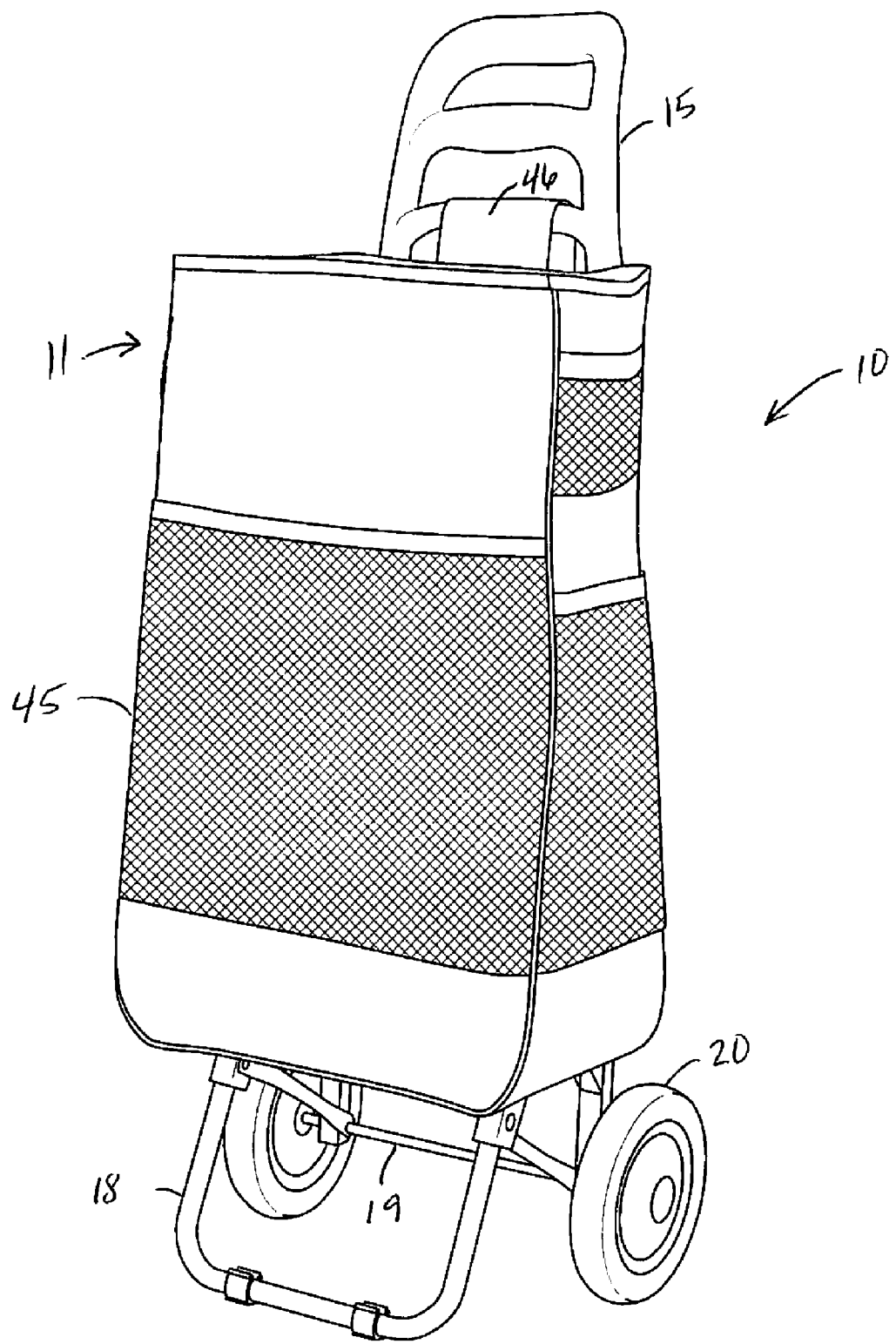
FIG. 2 is a front right perspective view of a preferred embodiment of the wheeled cart.

The present invention is a wheeled cart, denoted generally as 10, for transporting outdoor outing equipment. The device comprises, in general, a bag 11, a frame 12, and a strap 40 which holds one or more items of equipment that extends outside the bag 11 against the frame 12. Chairs used at outdoor events are often collapsible into collections of long tubes, which are then stuffed into tube-like nylon sleeves that are cinched closed, resulting in cylindrical bags. Such chairs are available commercially in various configurations, sizes and colors, and usually come with their own sleeves for storage. FIG. 1 illustrates the cart 10 of the present invention holding two such storage sleeves containing folded chairs 91. FIG. 2 illustrates an empty cart 10 of the present invention.

Figure 3:
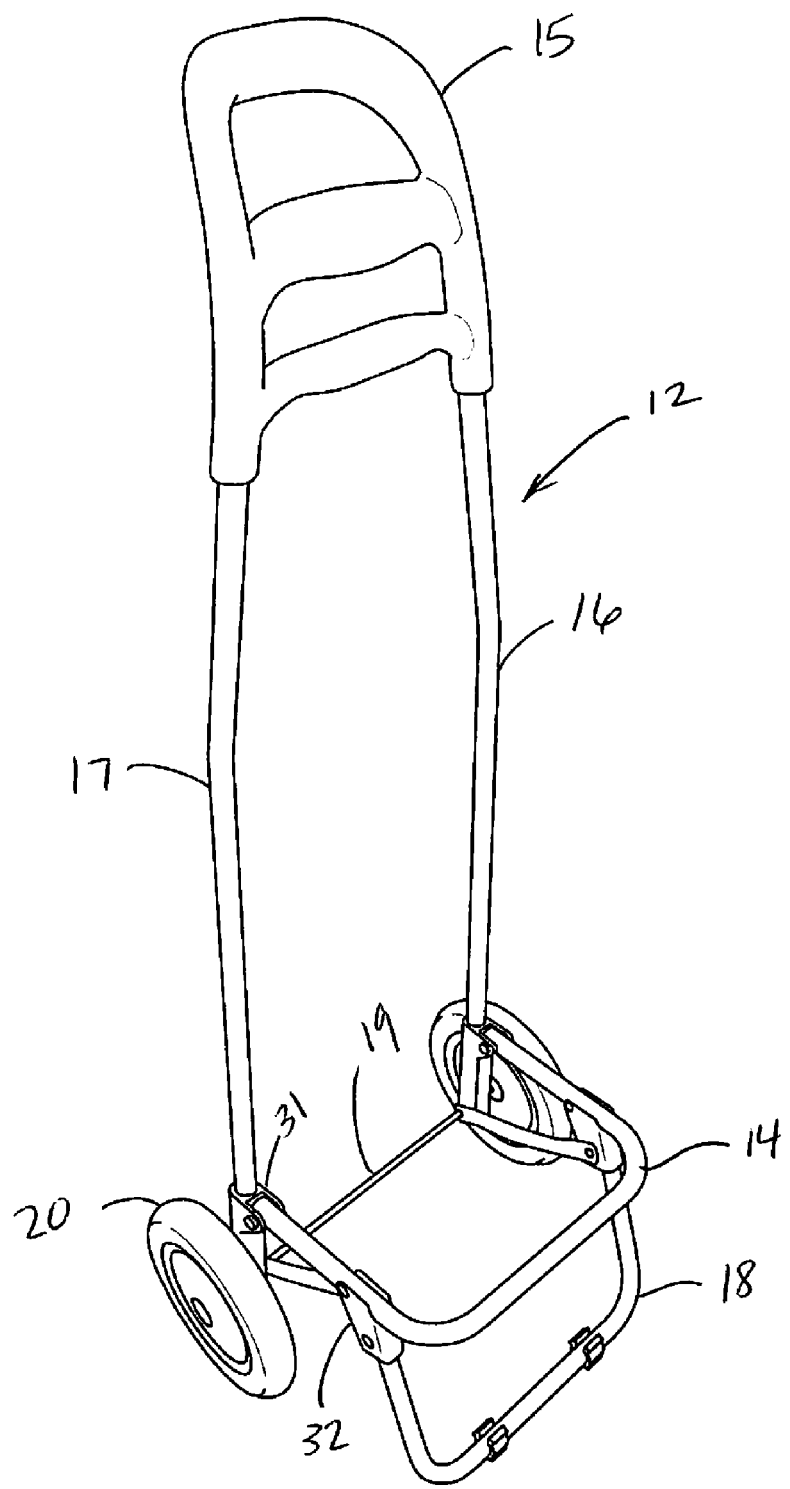
FIG. 3 is a front left perspective view of a preferred embodiment of the frame.
Figure 4:
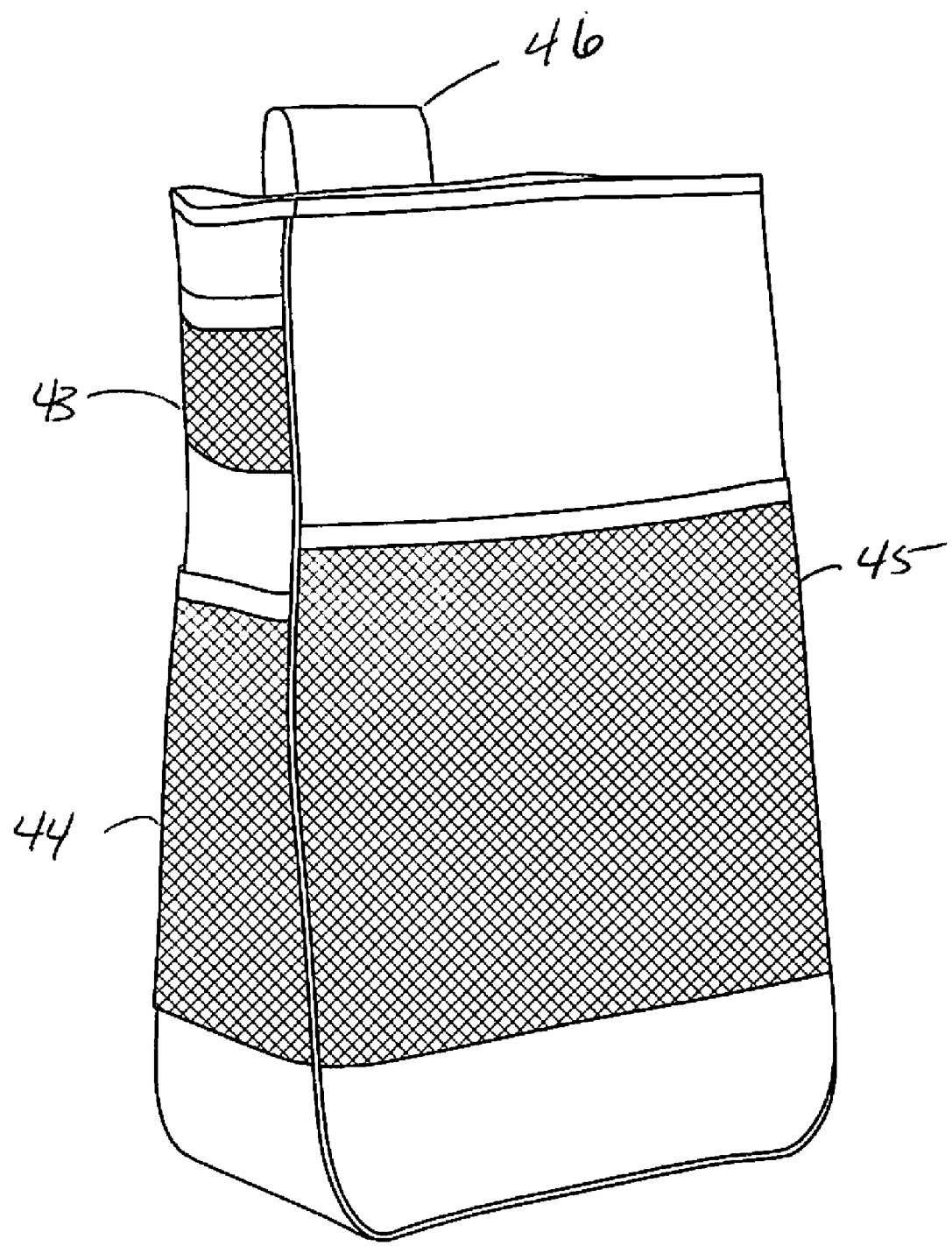
FIG. 4 is a front left perspective view of a preferred embodiment of the bag.
Figure 5:
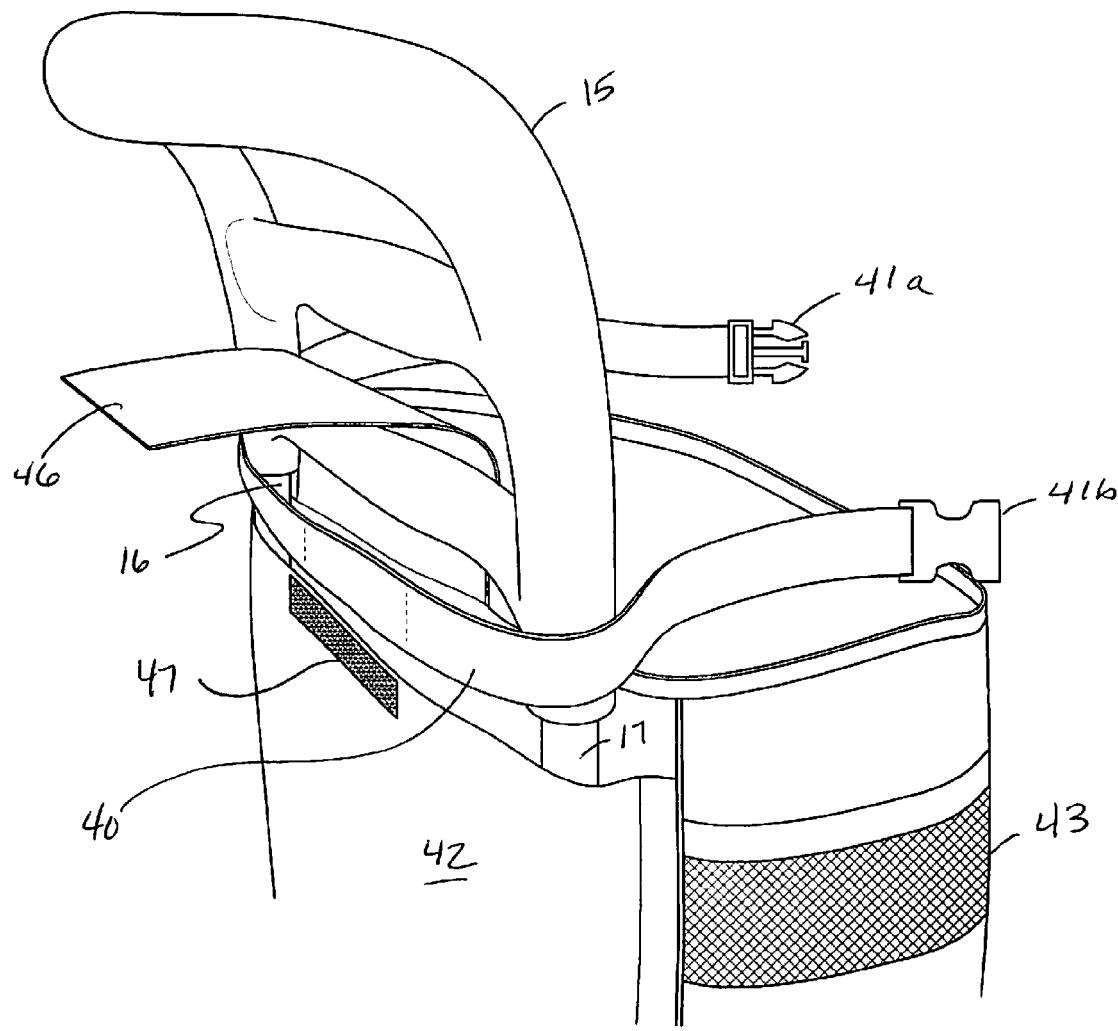
FIG. 5 is a rear perspective cutaway view of a preferred embodiment of the wheeled cart.

In a preferred embodiment, the frame 12 comprises a first upright leg 16 and a second upright leg 17, connected to each other by a handle 15. See FIG. 3. Preferably the frame 12 is substantially rectangular, having a two long sides opposite each other and two short ends opposite each other and adjacent the long sides. In an alternative embodiment, the upright legs 16, 17 can be connected to each other with a horizontal support, and the handle 15 can be attached to the upright legs or the horizontal support. Preferably, the gripping portion of the handle 15 is offset out of the plane of the frame 12 away from the bag 11 so that when the bag is filled completely, a user can fit his or her hand in between the handle 15 and the filled bag 11 to easily manipulate the position of the cart. See FIG. 5. As shown in FIGS. 2, 3 and 5, a preferred embodiment of the cart has a handle 15 with a plurality of cross-members, one of which may be the gripping portion.

In the preferred embodiment, the frame 12 also has a bag support 14 attached to the frame 12, which is used to support the bottom of the bag 11, as described in more detail below. Preferably the bag support is a tube that extends from the first upright support 16 and bends around to the second upright support 17 to approximate the circumference of the bag 11. In alternative embodiments, the bag support 14 may be a shelf, either solid or grate, of a shape approximating the circumference of the bag, instead of a peripheral tube. The frame 12 also has a stand 18, which supports and helps balance the cart 10 in a an upright position when not in motion The bag support 14 and stand 18 are preferably connected to the frame 12 such that, upon application of sufficient force, the bag support 14 and stand 18 collapse into a position substantially parallel to the frame 12.

Figure 6:
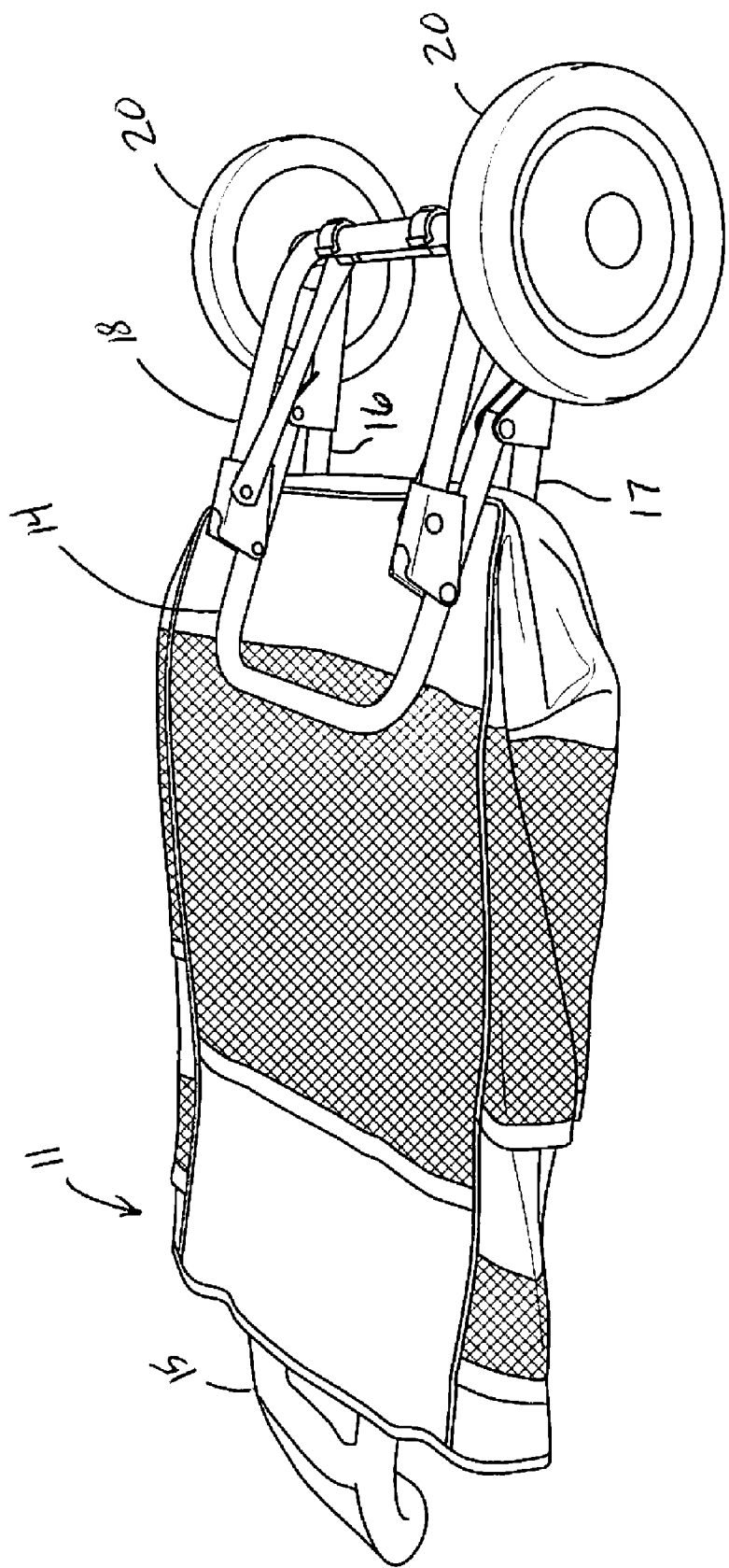
FIG. 6 is a rear perspective view of a preferred embodiment of the wheeled cart in a collapsed position.
Figure 7:
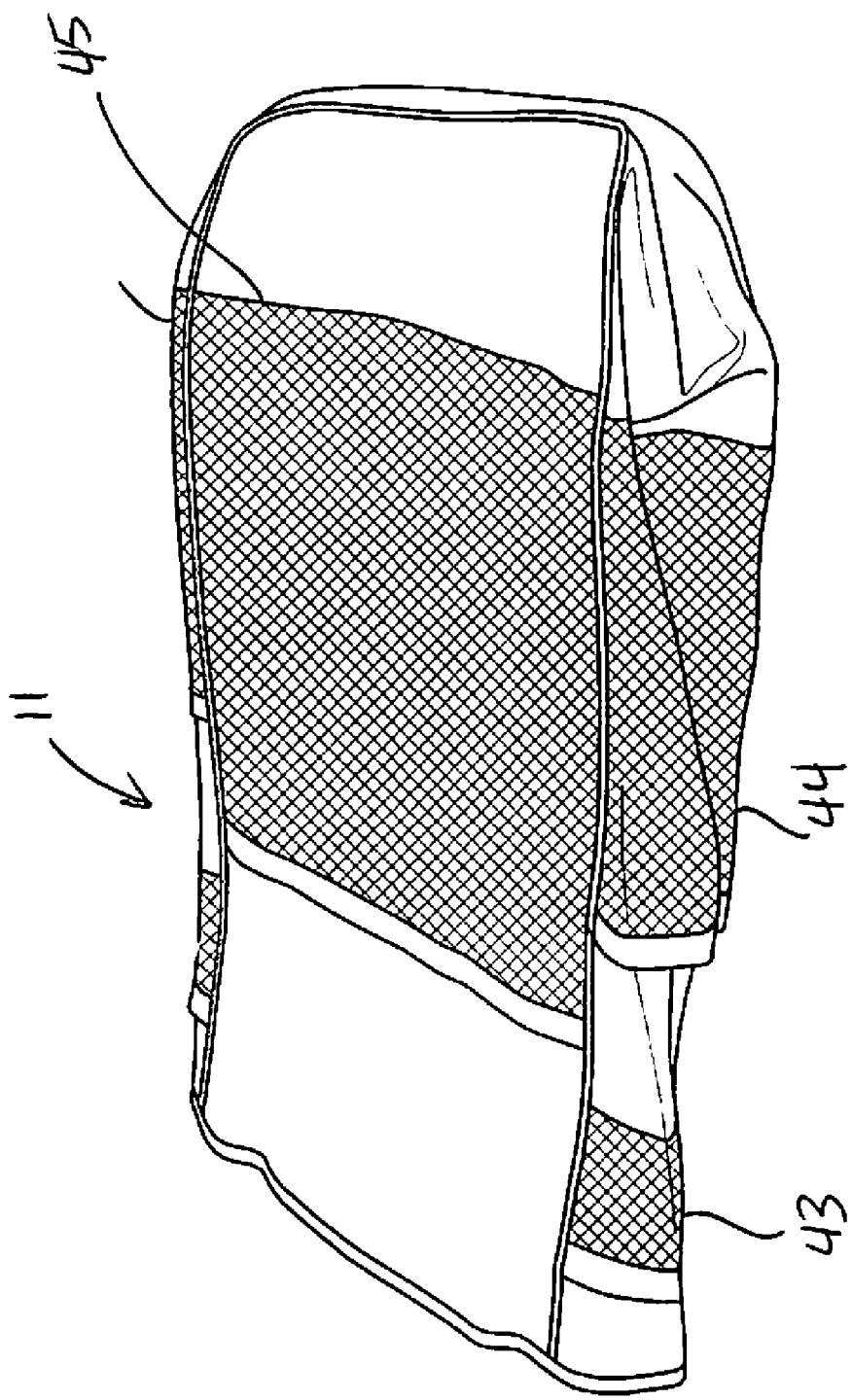
FIG. 7 is a rear perspective view of a preferred embodiment of the bag in a collapsed position.
Figure 8:
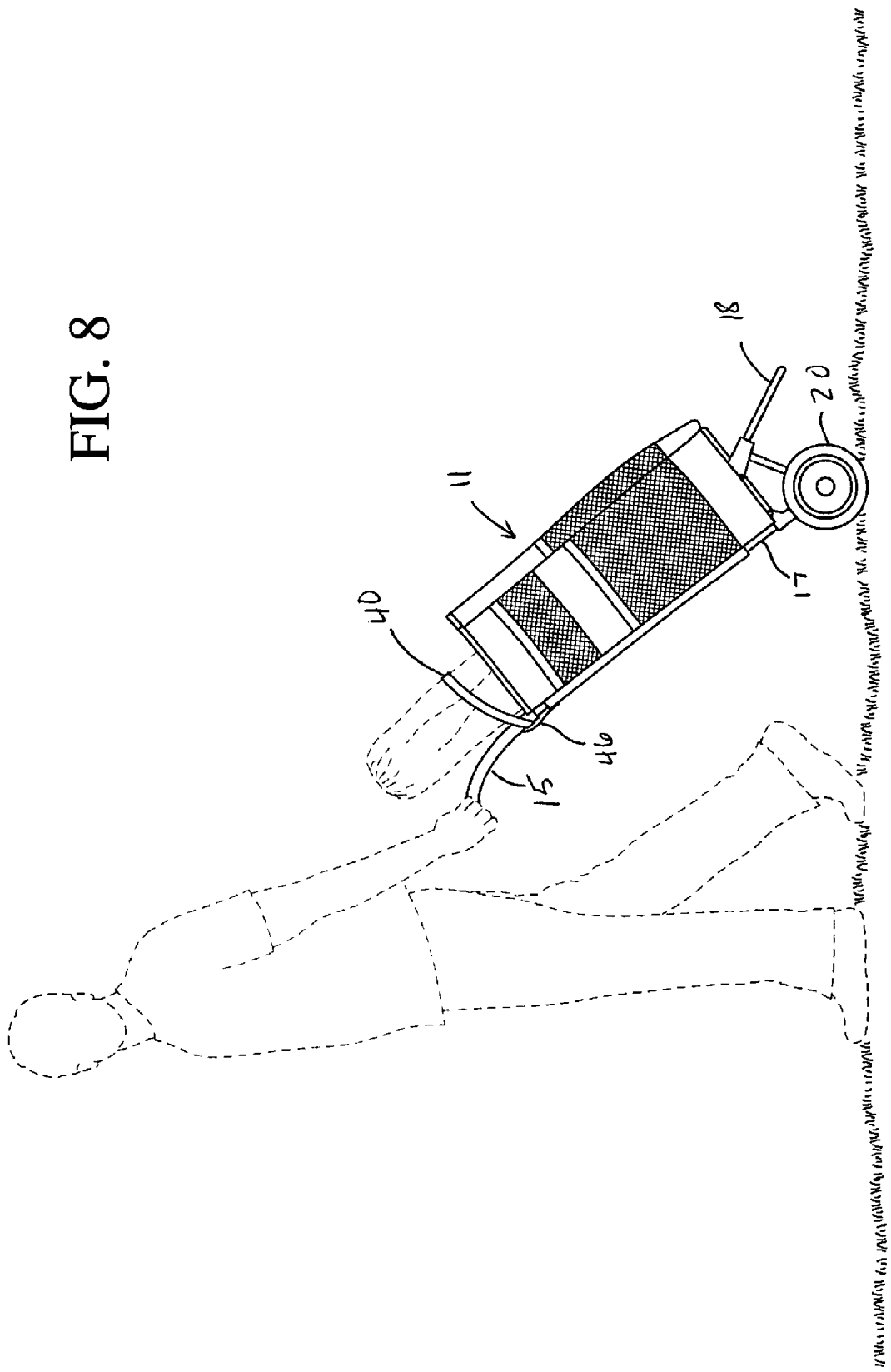
FIG. 8 is an elevation view of the cart in use.

The connections that allow the bag support 14 and stand 18 to collapse are preferably hinge-like, wherein portions of the bag support 14 and stand 18 rotate into the collapsed position around an axis. FIG. 3 shows a bag support hinge 31 and a stand hinge 32 that cooperate with the frame 12, bag support 14, and stand 18 to rotate around pins in the hinges, thereby enabling the frame 12 to collapse. See FIG. 6 which shows a preferred embodiment of the wheeled cart in a collapsed position and FIG. 7 which shows a preferred embodiment of the bag 11 in a collapsed position.

The cart has at least two wheels, one attached at each end of an axle 19, which is connected to the frame 12. Preferably the axle 19 is connected to second end of each of the upright legs 16, 17. Each wheel is preferably an airless rubber tire 20, designed so that the cart can be hauled over bumpy or uneven terrain without tipping over or otherwise transmitting every shock of the terrain to the individual moving the device. According to another embodiment, the wheels could be air-filled tires, and could be of a larger size. The preferred range for the diameter of the tires 20 is from 3 inches to 9 inches. A more preferred range for the diameter of the tires 20 is from 5 inches to 7 inches. A most preferred diameter of the tires 20 is 6 inches. In some embodiment, tires 20 of even larger sizes could be used. Preferably the tires 20 are offset slightly outward from the frame 12 of the cart to provide stability to the cart both when it is in a resting position and when it is being pulled or pushed by a user.

The bag 11 is an open-ended container, preferably soft-sided, like a duffle bag lacking one of its ends. The bag 11 comprises a side surface and a bottom. Preferably the periphery of the bottom of the bag 11 rests on the bag support 14. If the bag support is solid or a grate, the bottom of the bag 11 may additionally rest on the bag support 14. The cross-section of the bag 11 can take any shape, but is preferably substantially circular or rectangular. FIGS. 1, 2, 4, and 8-10 illustrate a bag 11 having a substantially rectangular cross section. The bag 11 may have compartments such as pockets on the outside, such as pockets 43, 44, and 45, and pockets in the inside (not shown). Preferably some or all of these compartments can be secured closed, with zipper, hook-and-loop closures such as Velcro®, snaps, or other fasteners, as known in the art. The compartments may be made of a mesh material, as shown, to allow visibility inside the compartments, and also to allow wet objects or objects containing sand or debris to be stored without molding or otherwise becoming damaged. Each compartment may be made of a flexible or more rigid non-mesh material as well, and may be configured to carry a specific item. For example, an inside pocket may be configured to hold the end of long items placed in the bag 11. Further, the bag 11 may have openings other than its open end to allow access to the inside of the bag 11. For example, the bag 11 may have a zippered opening, much like a duffle bag, that allows access to items resting on the bottom of the bag 11. These openings would provide particular convenience to access items inside the bag 11 if the cart were lying on its side.

Figure 9:
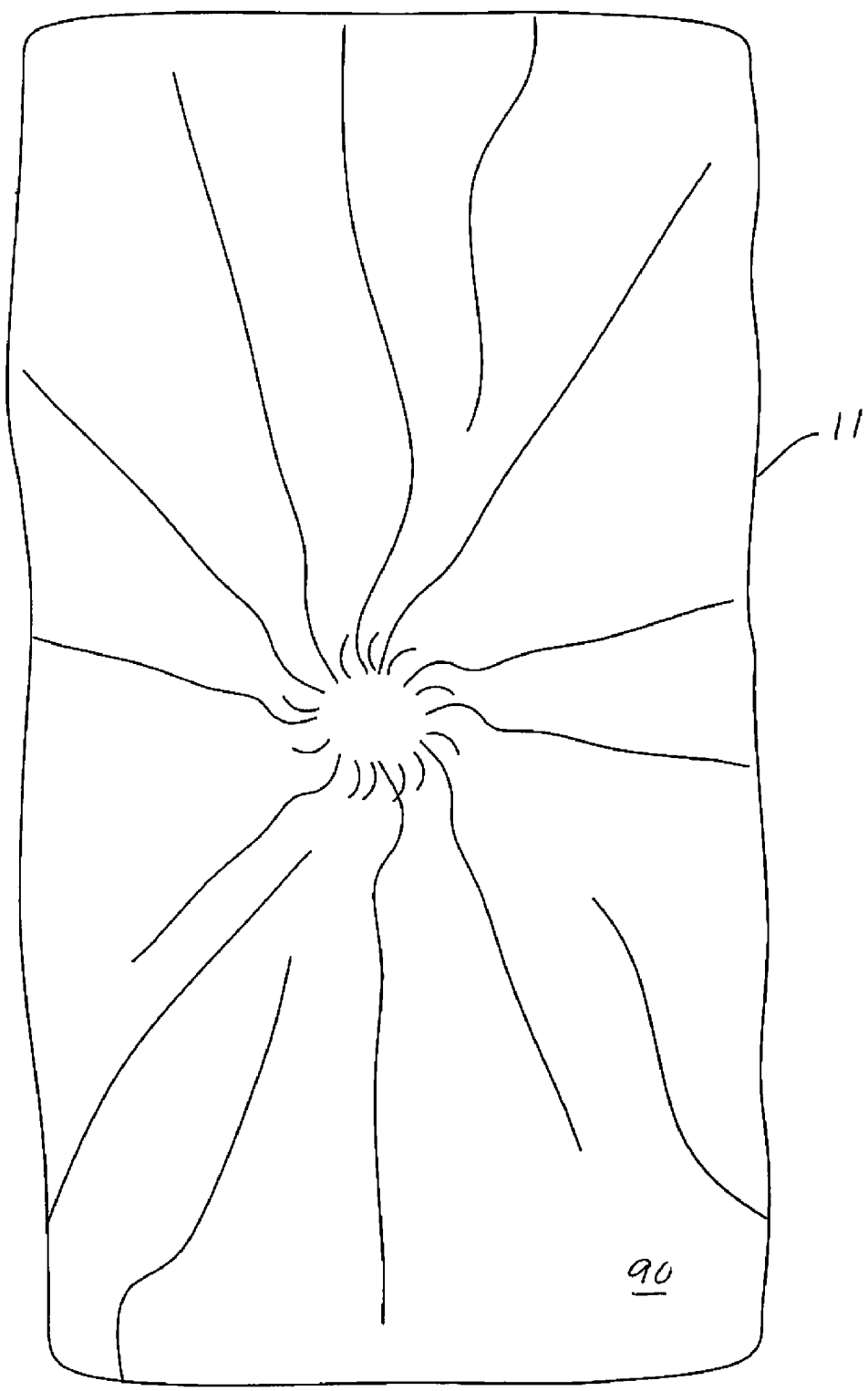
FIG. 9 is a top view of a preferred embodiment of the cart with the skirt cinched to close the open end of the bag.
Figure 10:
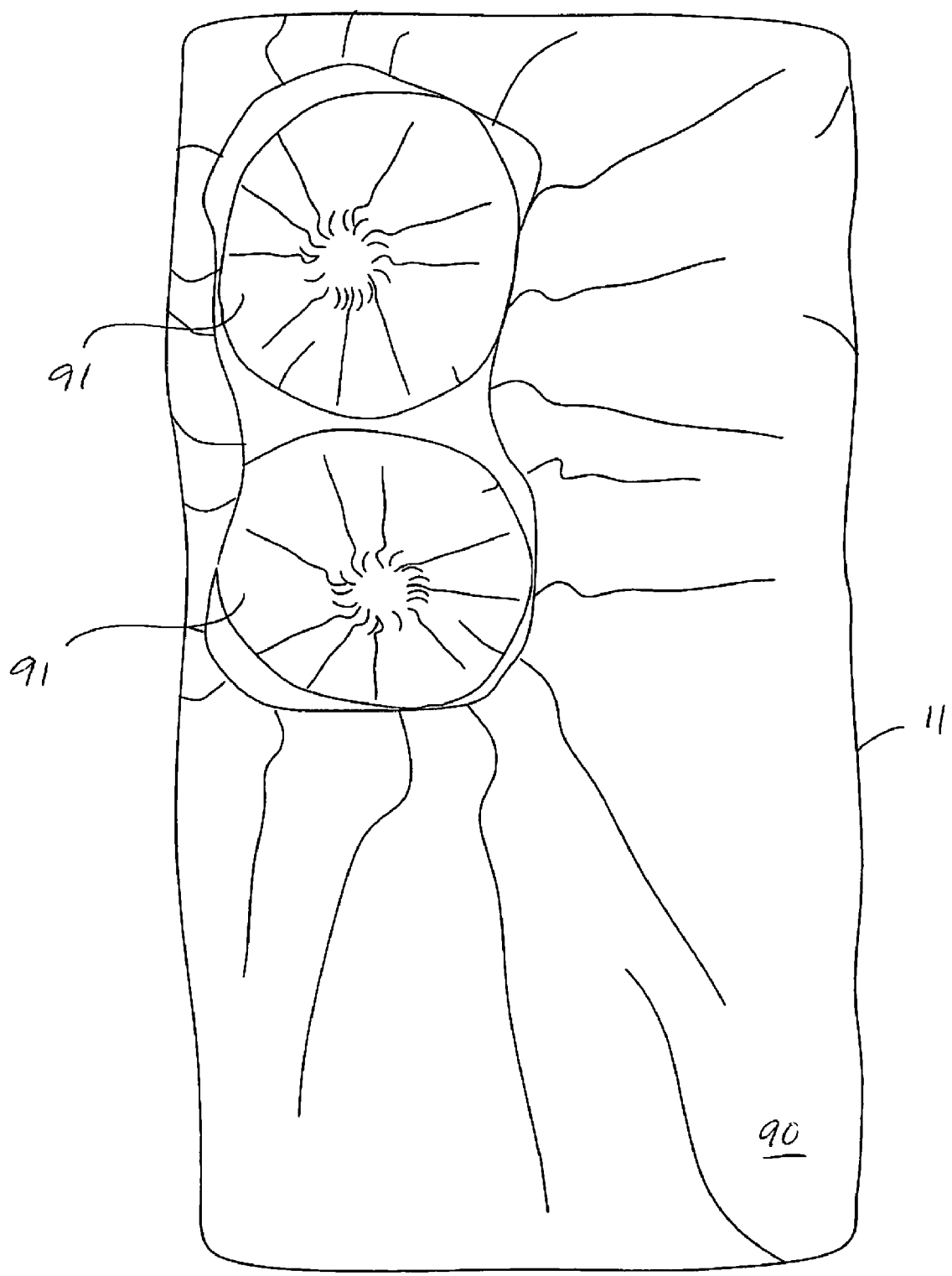
FIG. 10 is a top view of a preferred embodiment of the cart with the skirt cinched to close around two folded chairs at the open end of the bag.

The bag 11 is preferably fitted with a skirt 90 near the top of the bag 11, which can be cinched closed to secure loose items in the bag 11. FIG. 9 shows a top view of the bag 11 with the skirt 90 cinched closed. The skirt 90 can also be cinched around any items in the bag 11 that extend beyond the top of the bag 11, which will serve to secure loose items in the bag 11 at the same time. FIG. 10 shows a top view of the bag 11 with the skirt 90 cinched closed around two folded chairs 91, which in turn are in encased in storage sleeves that have been cinched closed. The bag 11 can be cinched with elastic, a drawstring tied or secured with a cordlock fastener, or other cinching methods known in the art. The bag 11 is made of a flexible and sturdy material, which includes cotton or nylon canvas and other materials known in the art of duffle bags and suitcases. The bag 11 is easily removable from the frame 12 and is preferably washable and replaceable, should the bag 11 wear out before the frame 12.

The bag 11 is attached to the frame 12 with a sheath 42. See FIG. 5. The first and second upright legs 16, 17 fit between the sheath 42 and the side surface of the bag 11 to hold the bag 11 against the frame 12 and to give structural support to the bag 11. The sheath 42 is attached to the bag 11 at the sides of the sheath 42 only, such that upper and lower openings are created for receiving the handle 15 of the cart. This allows the bag 11 to be easily attached to and removed from the frame 12. The sheath 42 extends approximately from the top of the bag 11 to a middle point between the top and the bottom of the bag 11. In some embodiments, the sheath 42 extends approximately the entire distance from the top to the bottom, to increase the rigidity of the bag 11. In various other embodiments, any number of sheaths can be employed, being tall or narrow, and being spaced apart from one another in various configurations, so that they retain the bag 11 to the frame 12 of the cart. The sheath 42 is preferably stitched to or integral with the bag, but may also be adhered or fastened in other ways, such as hook and loop fastener such as Velcro®.

The bag 11 may also be attached to the frame 12 with a flap 46. See FIG. 5. The flap 46 is disposed on the bag 11 to extend up and wrap around the handle 15, where it is then secured back to the bag 11 with a flap fastener 47. FIG. 5 shows a hook and loop fastener such as Velcro®, but snaps, ties or other fasteners may be used, as known in the art. The flap 46 helps the bag 11 from slouching when the cart is in its upright position. The flap 46 is particularly useful for holding the top of the bag 11 against the frame 12 when the bag 11 is stressed by the weight of items that extend beyond the top of the bag 11.

To better secure items in the bag 11 that extend beyond the top of the bag 11, a strap 40 is used to cinch the long items against the frame 12. Preferably the strap 40 is integral with or attached to the bag 11, as shown in FIG. 5, by stitching, adhesive or other means. Alternatively, the strap 40 can be attached to the frame 12, the handle 15, the long item, or even remain unattached. The strap 40 is designed to be wrapped around items that extend beyond the top of the bag 11, such as folding outdoor chairs in their folded position, or other long items such as a shade umbrellas. The strap 40 thus cooperates with the frame 12 to hold the equipment snugly against the frame 12 and substantially parallel to the first and second upright legs 16, 17, thereby limiting movement of the tall items and reducing the chance the cart will tip over when it is moved by a user. The strap may be made of elastic or inelastic materials, and may be a continuous loop or separable into sections that are connected around the items that extend beyond the top of the bag. Other items stored in the bag 11 can be accessed without removing the tall items secured by the strap 40.

FIG. 5. illustrates the strap 40 attached to the bag 11 by stitching. The strap has a quick connect buckle 41, with ends 41a and 41b, which are disconnected to wrap the strap 40 around the items, such as the folded chairs 91 illustrated in FIG. 8, and reconnected to hold them in place against the frame 12. The ends may be connected by other means such as hook and loop fastener such as Velcro®, a snap, springclip and loop, D-loops, or simply tied.

In another embodiment, the strap 40 is an elastic band that is unattached to the device or the equipment. Once the long items are loaded into the bag 11, the strap 40 is stretched over the long items and the handle and allowed to retract so that the strap 40 squeezes the long items against at least the handle 15, and preferably against one or more upright legs 16, 17. In another embodiment, the strap 40 is attachable to and detachable from the device 10, to an item, or to a storage sleeve that surrounds the item. For example, the strap 40 may further comprises a spring clip that attaches to a loop on the device 10, to an item, or to a storage sleeve that surrounds the item.

Figure 11:
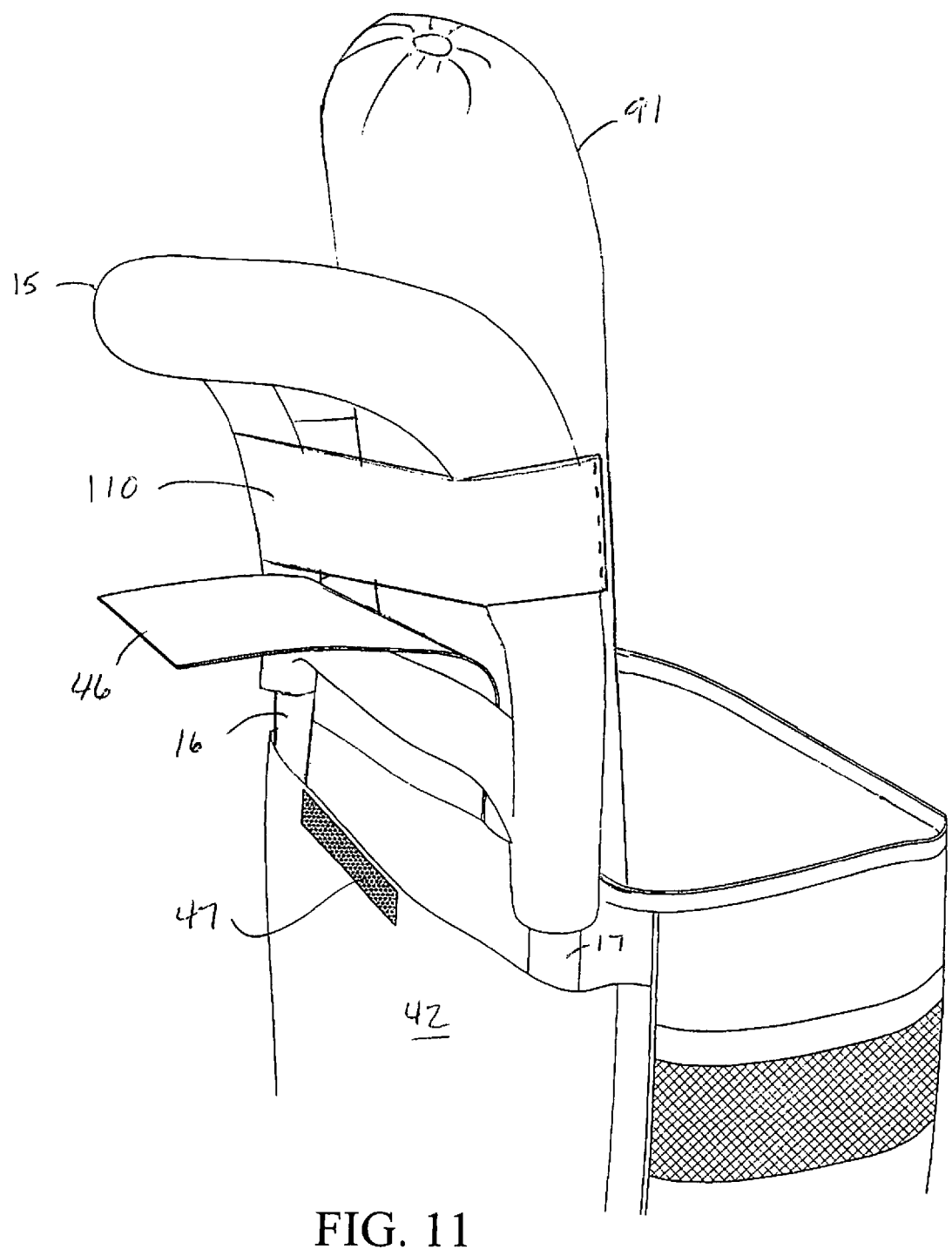
FIG. 11 is a rear perspective cutaway view of the cart with an item secured to the frame with a strap sheath.

In yet another embodiment, the strap is configured as a sheath, similar to the sheath 42 that attached the bag 11 to the frame 12, as described above. In essence, the strap sheath 110 can be considered a wide strap. The strap sheath 100 is preferably attached to the item that extends above the top of the bag, or to a storage sleeve that surrounds the item. FIG. 11 illustrates a folded chair 91 having a strap sheath 110 stitched to the storage sleeve of the folded chair 91. The handle 15 has been inserted between the strap sheath 100 and the folded chair 91 to hold the folded chair 91 in an upright position against the frame 12. The strap sheath can be stitched to or integral with the bag, but may also be adhered or fastened in other ways, such as hook and loop fastener such as Velcro®.

According to a preferred embodiment, the bag 11 is made of 620 D polyester and has five mesh pockets sewn onto the outside of the bag 11. The frame 12 is constructed of tubular metal and folds down for easy storage when the cart is not in use.

The tires 20 of the cart are positioned on the outside of the frame 12, which adds stability when moving over uneven, bumpy ground. The tires 20 are made of a rubberized plastic, which substantially reduces noise as the cart rides over blacktopped, paved and often gravelly roads or walkways. The tires 20 are over 6 inches tall, which allows the cart to ride over and into bumps and depressions in the ground while maintaining stability. The bag 11 is easily removable from the frame 12 and is washable and can be dried on a low heat setting. According to this embodiment, the cart can carry approximately 40 pounds of items. In other embodiments, the cart can have a more robust bag 11 and frame 12 so that it could carry a greater weight of items.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

I claim:

1. A collapsible cart for transporting outdoor outing equipment, the cart comprising:
   a) a frame comprising:
      i. a first upright leg and a second upright leg;
      ii. a handle connecting a first end of the first upright leg and a first end of the second upright leg;
      iii. a bag support hingedly connected to a second end of the first upright leg and a second end of the second upright leg; and
      iv. a stand hingedly connected to the second end of the first upright leg and the second end of the second upright leg;
   b) an axle connecting the second end of the first upright leg and the second end of the second upright leg;
   c) a wheel attached to each end of the axle;
   d) a bag comprising an open end, a bottom, a side surface, a back, a sheath, and a flap, wherein:
      i. the periphery of the bottom of the bag rests on the bag support;
      ii. the first and second upright legs fit between the sheath and the side surface to attach the bag to the frame; and
      iii. the flap is connected to the side surface of the bag at the back of the bag and wraps around the handle to connect with the sheath on the outside of the bag, thereby connecting the bag to the handle without the flap crossing the open end of the bag;
   e) a strap cinchable around the frame and one or more pieces of outdoor equipment that extend from the top of the bag, to hold the outdoor equipment snugly against the frame and substantially parallel to it; and
   f) a cinchable skirt connected to the inside perimeter of the bag near its open end.

2. The cart of claim 1 wherein the strap is non-elastic and is attached to the side surface of the bag wherein the attached section of the strap is substantially parallel to the open end of the bag.

3. The cart of claim 1 wherein the strap is attached to the outdoor equipment or to a storage sleeve that surrounds the outdoor equipment.

* * * * *